April 18, 1933. J. H. HOLMES 1,904,788
DISPLAY OF CUT FLOWERS
Filed June 8, 1932 2 Sheets-Sheet 1

Inventor:
Jesse H. Holmes,
Atty.

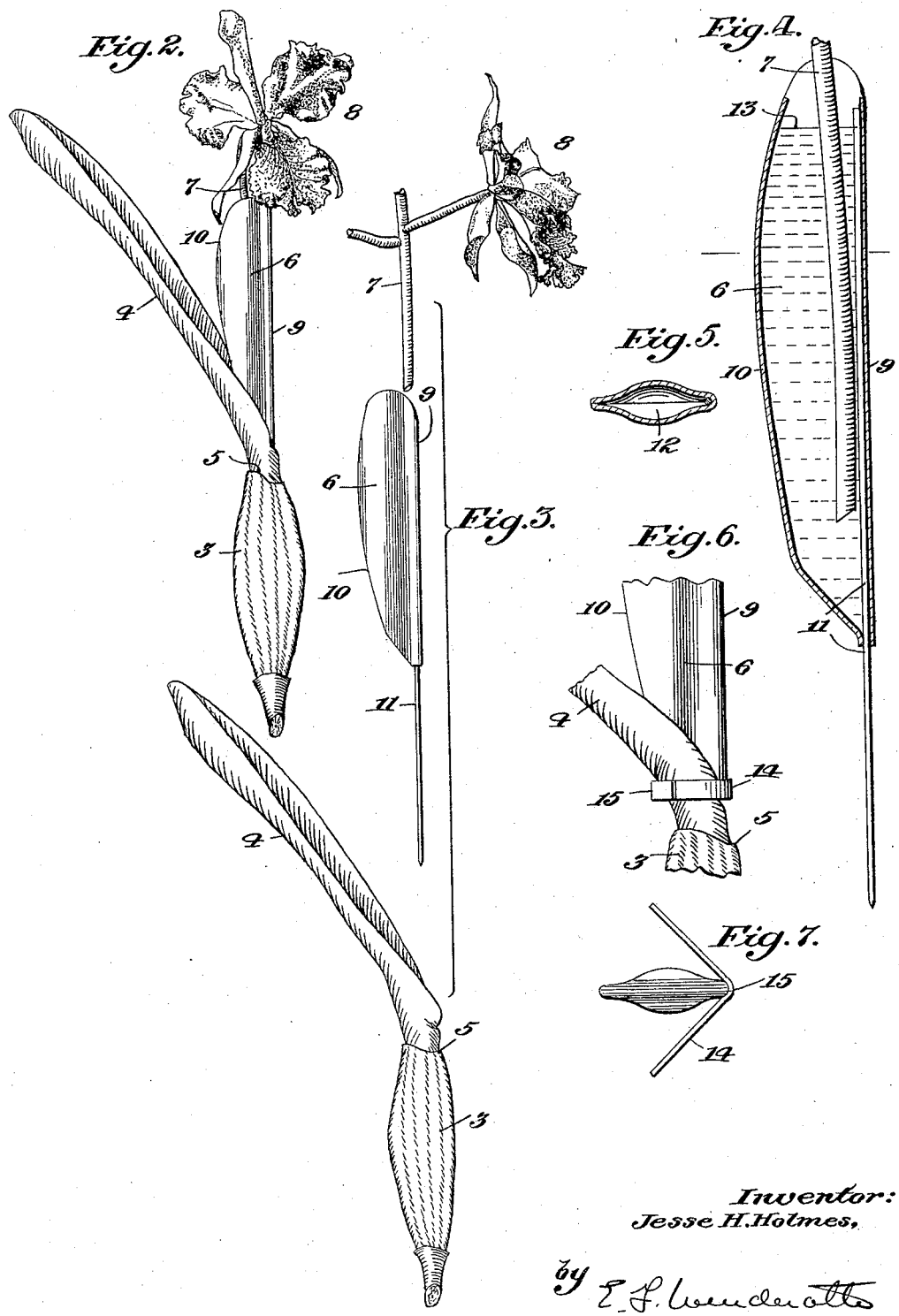

Patented Apr. 18, 1933

1,904,788

UNITED STATES PATENT OFFICE

JESSE H. HOLMES, OF BOUND BROOK, NEW JERSEY, ASSIGNOR TO THOMAS YOUNG NURSERIES, INC., OF BOUND BROOK, NEW JERSEY, A CORPORATION OF NEW JERSEY

DISPLAY OF CUT FLOWERS

Application filed June 8, 1932. Serial No. 616,131.

This invention relates to the display of cut flowers in the natural plant, in simulation of the naturally growing, blooming plant, and is particularly adapted to plants of the Orchidaceous family, such as the orchid, or any other plant having a flower with a stem which emerges from a sheath-like jointure with the main stem or pseudo-bulb, as the case may be.

In general, as applied to orchids, my invention involves the production of a water-tight, artificial sheath made of any suitable material, together with the method for attaching it at the point of emergence of the flower stem from the top of the bulb, to simulate the natural growth of the orchid sheath in position, the said sheath providing a receptacle to contain water in which the stem of cut orchid blooms may be placed so that the orchid flowers may be kept fresh while on display on the plants. The entire combination comprises my false sheath together with a growing plant to display in natural manner the actual cut flower, as though it were growing on the plant or on the cut or detached pseudo-bulb.

Since orchid plants usually flower only once a year, it was impossible prior to my invention to display the plant except during the two or three days of the year when it may be in flower. By using my false sheath and displaying the cut flowers, in connection with the plant when it is not normally in flower, the plant and flower can be used at any time for display purposes in florist's shops, before garden clubs, in the home, or wherever it may be desirable to display orchid blooms in a natural manner to obtain the fullest possible artistic effect.

By my invention, it is also possible to display in pleasing manner a combination such as the cut flower, the artificial sheath and the pseudo-bulb, all inserted in a vase filled with water.

To carry out my invention, as applied to an orchid for instance, a false sheath is provided, preferably formed of any suitable waterproof material, such as wax-impregnated heavy crepe paper, impregnated cloth, molded "Cellophane", gutta percha, or the like. The sheath is shaped to correspond with the natural sheath of the plant, is properly colored, and is provided with means for attaching it to the main stem or pseudo-bulb of the growing plant. The stem of the cut flower is inserted in the open end of the sheath, which preferably contains water, and the resulting effect is that of the naturally blooming plant.

An object of my invention therefore is to produce a new, partly natural, partly artificial blooming plant.

Another object of my invention is to produce a plant in which the plant itself is natural, but on which are displayed cut flowers, in simulation of the naturally blooming plant.

Another object is to evolve a method of displaying cut flowers in a natural plant, in simulation of the naturally blooming plant.

Another object is to evolve a method comprising securing an artificial sheath adjacent the jointure of the main stem or pseudo-bulb of growing plants, and displaying in said sheath a cut flower in simulation of the naturally blooming plant.

Another object is to produce a composite plant comprising a growing but not blooming plant, an artificial sheath secured to the main stem or pseudo-bulb of the plant adjacent the jointure thereof, and a cut flower mounted in said sheath in simulation of a naturally blooming plant.

Another object of my invention is to produce a pleasing display, comprising a water-filled vase, containing a pseudo-bulb, an artificial sheath and a cut flower.

Still another object is to produce a sheath to be attached to a growing plant adjacent the jointure of the pseudo-bulb or main stem thereof, and adapted to receive the stem of a cut flower therein.

Yet another object is to produce a sheath to be attached to a growing plant adjacent the jointure of the pseudo-bulb or main stem thereof, and adapted to receive the stem of a cut flower therein, the said sheath being shaped and colored to simulate a naturally growing sheath.

Other objects and advantages will more fully appear hereinafter, in connection with the description of the accompanying drawings showing by way of example one exemplification of my invention and wherein:

Fig. 2 is a detail showing the main stem or pseudo-bulb, the artificial sheath, and the blooming flower in assembled relation;

Fig. 3 depicts the elements of Fig. 2 in drop perspective;

Fig. 4 is a vertical section through one form of artificial sheath, the stem of a cut flower being shown as inserted therein;

Fig. 5 is a transverse section through the sheath of Fig. 4;

Fig. 6 illustrates a sheath employing a modified form of means for joining it to the main stem or pseudo-bulb; while Fig. 7 is a bottom plan view of the sheath and joining means of Fig. 6, partly developed.

Figure 1:
Fig. 1 illustrates the growing orchid plant in which the cut flowers are displayed by means of the artificial sheath.

Referring to Fig. 1, the pot 1 is shown as containing a growing plant 2 which, while illustrated as an orchid plant, may be any plant of the Iris family, or for that matter, any plant having a flower with a stem which emerges from a sheath-like jointure with the main stem or pseudo-bulb.

The pseudo-bulbs 3 have leaves 4 emerging therefrom at a jointure 5, and in the jointure 5 of certain of the pseudo-bulbs an artificial sheath 6 is mounted in any desired manner. This sheath is constructed to simulate as closely as possible in shape and coloring the natural sheath of the plant. This sheath receives, at its open end, the stem 7 of a cut bloom or flower 8.

As shown in Fig. 2—5, the sheath 6, which as pointed out above is formed of any suitable material, preferably water-proofed, such as wax-impregnated heavy crepe paper or cloth, molded "Cellophane" or other synthetic resins, gutta percha, or the like, is shaped in simulation of the natural sheath; that is, it has a generally oblong shape with one edge 9 substantially straight, the other edge 10 being curved abruptly at its upper outer surface, and then sweeping gradually towards the straight wall, joining the latter at that point of the sheath which contacts the jointure 5 of the pseudo-bulb 3.

A wire 11 may be provided for reinforcing the straight edge 9 of the sheath, and in the form now being described, this wire 11 is projected beyond the sheath 6, for insertion into the pseudo-bulb 3 at the jointure 5. As shown in Fig. 5 the sheath is compressed along its lateral surfaces, to form a constricted opening 12 for the reception of the stem 7 of the plant 8.

In the use of my new sheath, it is preferable to first insert the sheath in the pseudo-bulb at the jointure 5, and then fill the sheath to the level 13 with water, whereupon the stem 7 of the cut flower is inserted, and is supported in part by the snug fit provided by the constricted opening 12.

In another modification of my invention, as shown in Figs. 6 and 7, the wire 11 extends no further than the confines of the sheath proper, or may be omitted entirely, reliance then being placed entirely on the rigidity of the material from which the sheath is formed. In such case the sheath may be secured to the pseudo-bulb, for instance by means such as a band of pliable material such as soft metal. If desired the sheaths may come equipped with these bands 14, secured thereto as at 15, or the bands may be supplied separately. After being fitted about the pseudo-bulbs these bands 14 may be secured in position in suitable manner, as by crimping at 15. It is of course obvious that any suitable means are contemplated within the scope of the invention, for securing the sheath 6 to the pseudo-bulb 3.

It is still further contemplated, as pointed out previously in this disclosure, that a display be provided, comprising a water-filled vase, a pseudo-bulb inserted therein, an artificial sheath inserted in said bulb, and a cut orchid flower inserted in said sheath. In this manner a display is provided incorporating both the flower and the leaf of the plant.

Other modifications and adaptations will readily occur to those skilled in the art, once the broad features of my invention are disclosed, and accordingly, it is intended that the invention be limited only by the scope of the attached claims.

I claim:

1. A composite flower plant display comprising at least a portion of a growing plant of the type having main stems or pseudo-bulbs, and a flower emerging from a sheath-like jointure with said stem or pseudo-bulb, an artificial sheath in the simulation of said sheath-like structure, and attached to said main stem adjacent the jointure, and a cut flower having its stem inserted in said artificial sheath.

2. A composite flower plant comprising a growing plant of the type having main stems or pseudo-bulbs, and a flower emerging from a sheath-like jointure with said stem or pseudo-bulb, an artificial sheath in the simulation of said sheath-like structure, and having a wire thereon inserted in said pseudo-bulb at said jointure, and a cut flower having its stem inserted in said artificial sheath.

3. A composite flower plant comprising a growing plant of the type having main stems or pseudo-bulbs, and a flower emerging from a sheath-like jointure with said stem or pseudo-bulb, an artificial sheath in the simulation of said sheath-like structure, a band embracing the bottom of said sheath and at least partly encircling said pseudo stem adjacent its jointure, for securing said sheath thereto, and a cut flower having its stem inserted in said artificial sheath.

4. An artificial sheath comprising a body portion fashioned in simulation of the natural sheath of a plant, closed at one end and open at its other, and having two facing wall portions joined at their edges and forming between them a flattened oblong-shaped recess for the reception of a flower stem, one of the edges thus defined being substantially straight and the other edge being curved abruptly adjacent one end, and sweeping gradually inwardly towards its junction, at its other end, with said first-mentioned edge.

5. An artificial sheath comprising a body portion fashioned in simulation of the natural sheath of a plant, closed at one end and open at its other, and having two facing wall portions joined at their edges and forming between them a flattened oblong-shaped recess for the reception of a flower stem, and means on said sheath, adjacent said closed end, for securing it to a growing flower plant.

6. An artificial sheath comprising a body portion fashioned in simulation of the natural sheath of a plant, closed at one end and open at its other, and having two facing wall portions joined at their edges and forming between them a flattened oblong-shaped recess for the reception of a flower stem, one of the edges thus defined being substantially straight and the other edge being curved abruptly adjacent one end, and sweeping gradually inwardly towards its junction, at its other end, with said first-mentioned edge, and means on said sheath, adjacent said closed end, for securing it to a growing flower plant.

7. An artificial sheath comprising a body portion fashioned in simulation of the natural sheath of a plant, closed at one end and open at its other, and having two facing wall portions joined at their edges and forming between them a flattened oblong-shaped recess for the reception of a flower stem, and a flexible band on said sheath, adjacent its closed end, for securing it to a growing flower plant.

8. An artificial sheath comprising a body portion fashioned in simulation of the natural sheath of a plant, closed at one end and open at its other, and having two facing wall portions joined at their edges and forming between them a flattened oblong-shaped recess for the reception of a flower stem, one of the edges thus defined being substantially straight and the other edge being curved abruptly adjacent one end, and sweeping gradually inwardly towards its junction, at its other end, with said first-mentioned edge, and a flexible band on said sheath, adjacent its closed end, for securing it to a growing flower plant.

9. An artificial sheath comprising a body portion fashioned in simulation of the natural sheath of a plant, closed at one end and open at its other, and having two facing wall portions joined at their edges and forming between them a flattened oblong-shaped recess for the reception of a flower stem, and a wire extending at least partly into said sheath, adjacent one edge thereof, and projecting outwardly from the closed end thereof, for attaching the sheath to a growing plant.

10. An artificial sheath comprising a body portion fashioned in simulation of the natural sheath of a plant, closed at one end and open at its other, and having two facing wall portions joined at their edges and forming between them a flattened oblong-shaped recess for the reception of a flower stem, one of the edges thus defined being substantially straight and the other edge being curved abruptly adjacent one end, and sweeping gradually inwardly towards its junction, at its other end, with said first-mentioned edge, and a wire extending at least partly into said sheath, adjacent one edge thereof, and projecting outwardly from the closed end thereof, for attaching the sheath to a growing plant.

In testimony whereof I have signed my name to this specification.

JESSE H. HOLMES.